United States Patent [19]

Wieser

[11] Patent Number: 5,059,112
[45] Date of Patent: Oct. 22, 1991

[54] MOLD AND DIE OPERATION

[76] Inventor: Marianne Wieser, Ruppertschuettener Str. 64, D-8770 Lohr/Main, Fed. Rep. of Germany

[21] Appl. No.: 538,918

[22] Filed: Jun. 15, 1990

Related U.S. Application Data

[63] Continuation-in-part of Ser. No. 117,680, Nov. 5, 1987, abandoned.

[30] Foreign Application Priority Data

Nov. 7, 1986 [DE] Fed. Rep. of Germany ....... 3637982

[51] Int. Cl.$^5$ ............................................. B29C 45/18
[52] U.S. Cl. ................................... 425/546; 264/517; 264/571; 264/DIG. 78; 425/584; 425/DIG. 60
[58] Field of Search ............... 425/584, 447, 546, 812, 425/405.2, DIG. 60; 264/121, 517, 571, DIG. 78

[56] References Cited

U.S. PATENT DOCUMENTS 2,985,928 5/1961 Heskett ................................ 425/584

Primary Examiner—Timothy Heitbrink
Attorney, Agent, or Firm—Ralf H. Siegemund

[57] ABSTRACT

A mold or die having two parts with a cavity and an interface between them and a feed opening in one of the mold parts cooperates with a charge feed for raw changes and any evacuation device providing a low pressure. Alternatingly, the feed and the evacuation is connected to the feed opening, so that upon connection of the evacuation device, a pressure gradient obtains in the feed opening for obtaining an outflow of air from the mold cavity through the feed opening, while on connecting the feed to the feed opening, the pressure gradient in the feed opening is reversed for obtaining a flow of charge material into the mold cavity; a channel in one of the mold parts extends from the interface and peripherally in relation to the cavity, there being a shallow slot connecting the channel to the cavity; a seal circumscribes the channel to seal the cavity and the channel against atmospheric pressure; and a duct in the one mold part having the channel, leads from the channel to the evacuation so that the reversed pressure gradient into the feed opening and out of the cavity continues to discharge gases that develop during filling.

14 Claims, 1 Drawing Sheet

MOLD AND DIE OPERATION

This is a continuation-in-part application of co-pending application Ser. No. 117,680 filed Nov. 5, 1987, now abandoned.

BACKGROUND OF THE INVENTION

The present invention relates to the manufacture of parts under utilization of liquidous but curable material, particularly synthetic material and particularly under utilization of a mold or die having a cavity, there being a charge opening for feeding liquidous raw material into the mold which is then permitted to cure in situ; the part so made is subsequently removed. The invention relates specifically to a method of conducting procedures along the line outlined above as well as to equipment for carrying out such a method.

Synthetic material engineering involves, for example, the manufacture of parts from a material which, initially, is in some form of pasty or liquidous state but will cure, i.e. harden following, say, injection or other insertion of feed into a die, mold or the like. This procedure establishes a particularly contoured part. The molds thus used for this purpose usually include several releasable interconnected parts which are separated later in order to free the cured component so that the mold or die can be reused as soon as possible. Synthetic material, e.g. thermoplastic material but also wax or ceramic is envisioned as raw material.

As the die or mold cavity is charged with more or less liquidous raw material, the air occupying the mold cavity is displaced, a process which requires a certain period of time. Subsequent to filling, another period of time has to elapse to obtain curing and before the mold or die can be opened. The discharge of air is usually carried out through dividing surfaces, interfaces or the like which divide the interior cavity of the mold or die. In order to avoid the formation of air bubbles or other kind of gas bubbles and to reduce mold and die working cycle time, it is generally suggested to pressurize the liquidous charge and to force it into the die cavity under pressure. Also ducts are provided so that the air can completely discharge from the mold or die cavity, on charge thereof with liquidous raw material. This procedure requires the utilization of a press with a pressurized plunger, or an injection mold machine or the like wherein the performance determines the quality of the product as well as the duration of the cycle time. Also, certain gases may develop in the mold or die cavity and they act like a filling impediment, owing to the counter-pressure they develop.

DESCRIPTION OF THE INVENTION

It is an object of the present invention to provide a new and improved method and equipment for the manufacture of form parts made of curable material under utilization of a die or mold being charged with liquidous or pasty raw material and under utilization of a structure which permits the part that is being made to be removed from the die with ease.

It is a particular object of the present invention to improve both method and equipment of the type referred to in the preceding object statement, under utilization of reduced technical expenditure and under observance of uniform cycle times, particularly for reasons of maintaining a particular quality.

In accordance with the preferred embodiment of the present invention it is suggested to provide, prior to feeding the mold or die cavity, a low pressure in that cavity so as to obtain, specifically, an outwardly (for the cavity) oriented pressure gradient in the same opening through which subsequently the liquidous material is charged into the mold. Preferably, separate, low pressure gas discharge from the mold cavity is maintained during filling at a point remote from the charge opening. The reduced filling pressure in the mold cavity is significant for several reasons, particularly when maintained during feeding. First of all, depending upon the low pressure, the air will be completely removed and the formation of gas bubbles or the like is almost certainly excluded. On the other hand, by operation of the separately applied low pressure, a reduced pressure is effective in the mold or die cavity and is continued for maintaining that low pressure during filling, causing the material to still be sucked into the mold cavity even if not under particular external pressure. Actually, the influx of charge material is accelerated for radial flowing into the cavity; this has a beneficial effect as far as feeding time is concerned, without requiring pressurizing of the raw material, and thus reducing the cycle time. The pressure gradient in the feed opening reverses in the beginning of filling, as compared with the pressure gradient during evacuation, and the subsequent low pressure application makes sure that this filling enhancing reversal pressure gradient is maintained and is not counteracted or offset by any build up of gas pressure from gases that emanate from the filling charge.

Basically, the method is independent as to whether or not the material itself is or is not pressurized. Pressurization in principle is not necessary and a high quality of the product and a reduction in cycle time still be obtained. Moreover, already designed and existing equipment permits practicing the invention on a supplemental retrofitting basis. By retrofitting, product quality can be increased and cycle time reduced in old machines, thereby premitting an increase in their efficiency.

The inventive method as described can be realized basically by two different kinds of equipment. They have in common, however, that the respective mold or die parts are made from two interconnected components which will be disconnected for purposes of removing therefrom the cured and completed part. The interior is, of course, configured as a negative of the part to be made. The interface or dividing surfaces as between the two mold parts begins in all directions in the cavity and runs therefrom in the outer direction. The interface, therefore, serves to facilitate the removal of the cured and completed part, while on the other hand, it is available for additional features permitting removal of gas and air from the interior. All these aspects are the same for both versions.

Also, in both versions a supplemental channel runs from the interior of the mold cavity towards the outside. In order to prevent the liquidous material from entering any of these channels, a shallow slot decouples the mold cavity from this duct or channel system as far as the plastic charge material is concerned. The slot, on the other hand, is adequate for evacuation purposes. The channel and duct system is connected to a pressure reducer which is external to the equipment. Several such ducts may be provided which run directly from the interior cavity to the outside. The shallow slot, as stated, is sufficiently narrow to obtain an adequate resistance against outflow of the plastic material.

The invention can be realized by an adapter nozzle with a movable injection nozzle being positioned on the outside of the feeder opening proper. The adapter nozzle itself is enclosed in a movable member which seals against the mold or die and this hoodlike member is connected with the low pressure or pressure reducing device through an appropriate channel or duct system. The main mold or die cavity, as well as the interior of the adaptor nozzle member, is evacuated. It is decisive that the mold or die cavity is evacuated through the filling opening before the injection nozzle is applied thereto. The liquidous raw material is introduced through the charge nozzle thus blocking off the low pressure from that end. The nozzle initially has a distance from the charge opening but is shifted for the feeding right in front of and on top of the charge opening. The charge nozzle will, in all cases, or at least under normal operating conditions, abut directly the mold right at the charge opening and is appropriately sealed therewith. In an alternative version, the charge may obtain through a hopper or bin and a multiple path valve. In both cases there is a dual evacuation, first through the filling opening; later, low pressure application to the mold cavity is continued during filling at a point remote from the filling opening.

An essential consequence of the invention is that it is no longer necessary to introduce a material through pressurized chambers, because a low pressure gradient is obtained in the cavity and this is sufficient to induce the flow of the raw material into the cavity. As stated, the pressured injection devices are still used but pressurization is simply no longer essential. In fact, a low pressure or no pressure feeding structure is preferred.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings, FIG. 1 shows certain parts in side view and in elevation and other parts in cross section. Here basically a mold is provided being comprised of upper and lower mold parts 1 and 2 respectively defining between them a mold cavity 5 that is of a fairly complex configuration. A channel 3 extends in the interior of the mold and basically in the interface between the mold parts 1 and 2, around the periphery of the cavity proper. Bores and ducts 6 and 7 leading from the channel 3 provide conduits to connection facilities 8 by means of which a vacuum is going to be applied to the interior of the mold cavity, rather remote from the point of filling the mold cavity.

Figure 2:
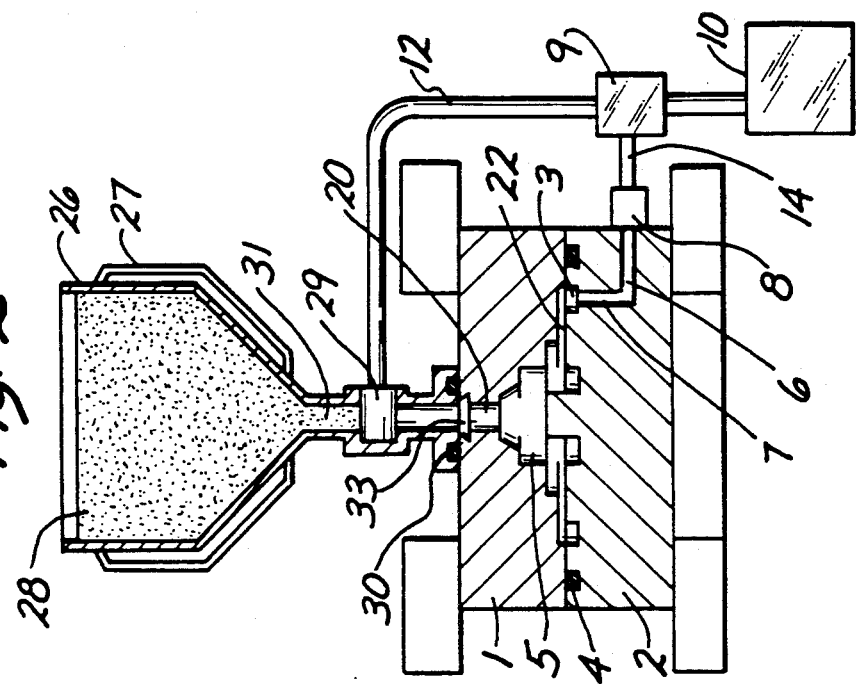
FIG. 2 is a cross section through another example for practicing the best mode therein under utilization of pressureless feeding.

Opposite the channel and duct system 3, 6 and 7 and on the respective other side of the cavity 5, a rather shallow slot 22 is provided which has the task of keeping any raw material charge from penetrating into the duct system 3, 6 and 7. Slot 22 can also be deemed to be a non-functional, peripheral extension of the mold cavity serving as buffer space for the evacuation procedure. However, that slot 22 is directly instrumental in the application of lower pressure during filling.

Cavity 5 is accessible through a basically vertically extending charge duct and opening 20. The parts 1 and 2 of the mold, moreover, define an interface 32 between groove 25 which are provided in the lower mold part 2 and adjoining the respective plane as defined by that interface. Seals or a seal ring 4 is received by groove 25. The mold or die parts 1 and 2 in addition are connected to clamping table constructions 21 and 23 respectively by means of which the mold or die parts can be separated, but are also held together during filling and injection.

An adapter nozzle is operatively and conductively connected to and around the charge opening 20. This adapter structure includes a cover or hoodlike element 16. The front end 16a of that cover element has a groove which receives a sealing ring 18 to permit sealing of the interior 19 of the hood 16 against the top of the mold member 1. Decisive is that in the prior to sealing, the open end of the hood communicates with the open end of filling opening 20.

A nozzle member 15 with internal nozzle duct 15b is movably disposed in the adapter hood 16 and constitutes a part thereof. The front end of nozzle member 15, and particularly the opening of duct 15b, face opening 20 and are, in fact, situated in the interior 19 of the adapter case or hood 16. Member 15 is movable in and relative to hood 16 and can actually be brought into an abutment or resting position on the mold part 1. This way opening 20 and cavity 5 accordingly can be immediately supplied with liquidous raw material.

The interior chamber 19 of case or hood 16 is sealed vis-a-vis the nozzle member 15 by means of a seal 17, and as far as the exterior is concerned, the sealing 18 already mentioned provides for the requisite connection to the mold parts. Relative motion between the spray nozzle 15 and the adapter nozzle housing, case or hood 16 is carried out through moving elements 24. They are shown as springs by means of which case or hood 16 is suspended from holder 15a from which nozzle 15 extends. The entire assembly 15/16/24 can be placed into an outer sleeve (not shown). As holder 15a is lowered, hood 16 with seal 18 will sit on mold body 1, the front end of nozzle member 15 hovers above opening 20.

The interior chamber 19 of cover or case 16 will be connected through an appropriate bore 11a with a connection and duct 11. It is now an essential aspect of the invention as realized in this particular embodiment that the connections 8 and 11 are connected through conduits 12 and 14 as well as a valve 9 to a low pressure generator 10 which in effect evacuates the interior and all parts of the mold. This way it is possible to provide the interior 19 of the adapter nozzle case 16 and independently therefrom, cavity 5 through the channel 3 and the bore 6 and 7, with an internally effective low pressure or quasivacuum. In particular, the primary evacuation is carried out via valve 9, conduit 12, connector 11 and duct 11a. As the interior 19 of hood 16 is evacuated, the latter is sucked against the mold part 1 (seal 18) and the mold cavity 5 is evacuated through opening 20 such that a pressure gradient obtains through that opening in outward direction i.e. air is sucked out of the mold cavity 5 through the opening 20 so that the direction of air flow is opposite to the subsequently ensuing charge flow for the mold.

After the pressure in the cavity 5 has dropped to or below a particular value, it is advisable to begin the operating and feed cycle, namely feeding the cavity 5 with a liquidous raw charge. Feeding is obtained by further lowering part 15a until the front end of nozzle member 15 sits on mold member 1. This stops the suction as soon as the raw charge will flow through the nozzle duct into opening 20. It should be noted that the device shown already constitutes a refinement. It may be sufficient in case of simple parts to be made, to evacuate just through conduit path 11a, 11 and 12. However, in the illustrated version, evacuation of chamber cavity 5 can be continued even when 19 is no longer evacuated through the system 9-14-8-6-7-3.

Figure 1:
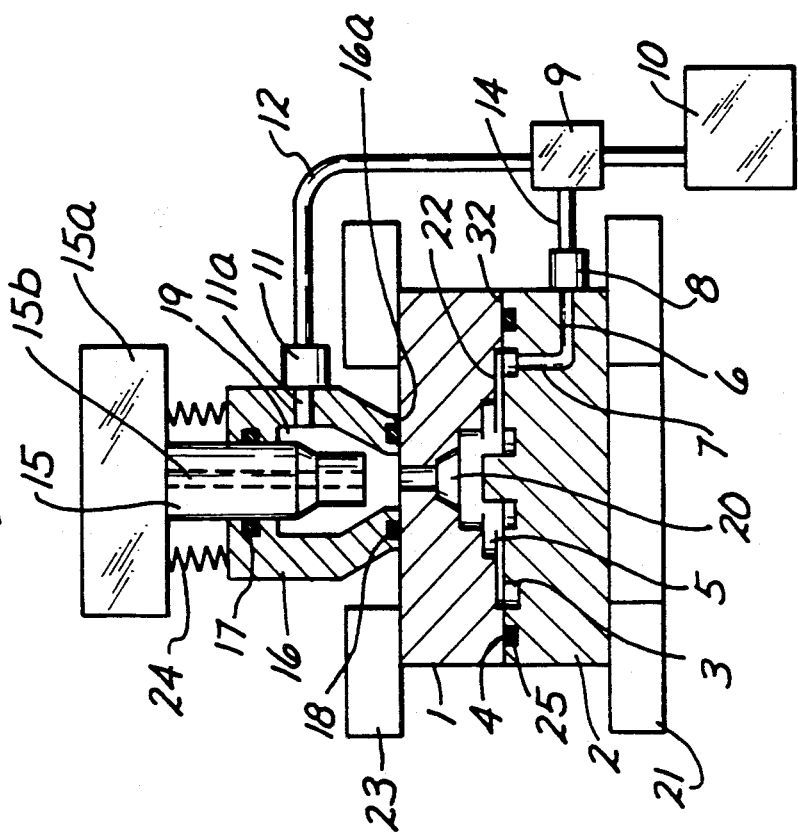
FIG. 1 is a cross section through a device in accordance with the preferred embodiment of the present invention under utilization of adapter and spray nozzles.

The following example will be described by means of which the invention has been practiced with advantage. For example it is assumed that the die or mold is made of parts with outer dimensions of 2000×800×700 mm. A spoiler for a car is to be made of thermoplastic material e.g. polystyrol is to be molded under utilization of the vacuum procedure and the adapter 16 as shown. It is assumed that the interior cavity 5 has an overall volume of about 10 l. The two parts 1 and 2 for the mold are held together and nozzle 15 with holder 15a are bolted to a conventional injection molding machine. The lower nozzle part as shown in FIG. 1 is funnel shaped and its sleeve is appropriately sealed (18).

The adapter nozzle 15 and particularly the duct 15b is matched in contour to the charge opening 20 and the connection to the injection molding machine is made accordingly. This adapter is slidably connected to the nozzle head 15 of the machine through resilient pressure pieces 24 to permit sliding, airtight sealing being provided at 17. The pneumatic hose 12 with rapid connection 11 is air-tightly sealed to that particular venting channel which leads to the outside. As stated, the connection is made to a conventional and commercially available vacuum pump 10.

The die halves 1, 2 are interconnected and the vacuum unit 10 sucks air through the adapter nozzle 16 and the internal channel system 6, 7, 3 from the mold or die cavity 15 as well as through the air-tightly sealed adapter nozzle case or hood 16. On the other hand, the nozzle head 15 now moves towards the filler opening 20. As soon as the nozzle head 15 abuts the filler opening 20 of mold part 1, vacuum pumping of space 19 is interrupted by the valve 9. The pressure in the mold cavity has been reduced to 0.001 mbar and now the thermoplastic material is injected into this cavity. During the injection, however, there is further vacuum pumping through the connection 8.

Advantageously, the channels 3, 6, 7 are peripherally remote from the charge opening 20 so that the liquidous material as it enters the cavity will spread and the air in the cavity will be displaced, while the area near the openings (shallow ducts 22) of these channels into the cavity are covered last. This way any bubbles are in fact captured in an optimal fashion and evacuation obtains throughout the charge procedure. The channels (3), as stated, should run at least to some extent in the interface surface. Grooves with seals are provided in the interface for sealing against the outer atmosphere. In this manner and, as compared with prior art, it is no longer necessary to have air forced through the interface during charging, since the channels are sufficient for that purpose.

As soon as the mold cavity or die cavity has been filled, the vacuum pumping is entirely interrupted and the nozzle 15 retracts. Thereafter the content in the mold cavity is cured and depending upon the curing data, the mold will be open by having table 21 and 23 retract from each other. The completed thermoplastic product part actually drops out of the opened die. Then the die halves are reconnected, vacuum is again applied, and the evacuation and injection molding are in fact repeated just as before.

The embodiment shown in FIG. 2 has many parts similar to the embodiment shown in FIG. 1 and this involves particularly the configuration as far as mold or die parts 1 and 2. The mold cavity 5 and the bores and ducts 3, 6 and 7 are also similar. There is also a connection of this evacuation system to a low pressure generator or pump 10, and fastening of the members to tables and other structures is provided analogously. All these parts are similar to those shown in FIG. 1 and the description is adopted accordingly.

However, in lieu of an adaptor nozzle, a rapid action closure element 33 is (and remains) connected to thereby connect a hopper, bin or container 26 with discharge duct 31 to the mold or die, right at the feed opening 20. A three-way valve 29 is provided in the discharge duct 31 of the hopper, container or bin 26. Container 26 is provided to hold a certain amount of liquidous raw charge 28. This container 26, moreover, is provided with a heating jacket 27. A seal 30 provides gas tight sealing and connection of this charge device to the opening structure 20 of the mold or die parts.

In a first position, the valve 29 opens a flow connection between bin/container 26 and mold while blocking off the connection to hose 12. In an alternative position of valve 29, the flow connection from 26 is interrupted and instead hose 12 and low pressure and suction device 10 are flow conductively connected to charge opening 20. This is again a connection that establishes a pressure gradient and drop in opening 20 for an outflow of air from the mold cavity which is directed opposite to the subsequent charge flow.

There is, at first, the evacuation procedure through feed opening 20 with bin 26 being closed off, and as the valve 29 changes position, it permits feeding of the mold cavity which, of course, will evacuate as before through 22, but now the charge obtains exclusively under utilization of normal atmospheric pressure. Feeding and metering of the material 28 is carried out through a quantity control device that may be included in valve 29.

In order to make sure that the material that is to be charged into the mold is sufficiently liquidous, e.g. in a thermoplastic state, it is being heated through the heating jacket 27. This heating jacket 27 surrounding the container or bin 26 may operate on a variety of phenomena and, e.g. it may be an electric heater, a hot water heater, a steam heater or a hot oil heater.

As a consequence of the invention, one has available an extensive degree of feasible kind of molding and, to be basically independent from particulars of a complex contour of the cavity 5, or even multiple cavities, the quality of the parts to be made can still be increased while at the same time and with the same features the cycle time for successive charges and feeding is decreased. This is particularly so, because the inventive feeding device provides not only for adequate feeding, but the reliability of complete filling is very great, and therefore the quality of the product to be made is higher while a greater economy is observed.

The invention is not limited to the embodiments described above but all changes and modifications thereof, not constituting departures from the spirit and scope of the invention, are intended to be included.

I claim:

1. In a mold having a first mold part and a second mold part with a cavity and an interface between said mold parts, the improvement comprising:

a feed opening in said first mold part;

charge feed means for supplying and feeding material to be molded in the mold;

evacuation means for providing a low pressure;

means for alternatingly connecting the charge feed means and the evacuation means to the feed opening, so that upon connection of the evacuation means to the feed opening, a pressure gradient is obtained in the feed opening for obtaining an outflow of air from the mold cavity through the feed opening, while on connecting the feed means to the feed opening, the pressure gradient in the feed opening is reversed for obtaining a flow of said material into the mold cavity;

a channel in said second mold part and extending from the interface and peripherally in relation to the cavity, there being a shallow slot connecting the channel to the cavity;

sealing means circumscribing the channel to seal the cavity and the channel against atmospheric pressure; and a duct located in said second mold part, the duct leading to the channel, and being connected to the evacuation means, so that the reversed pressure gradient in the feed opening and in the cavity continues to be effective, on account of the cavity and the channel being continued to be evacuated and sealed by the evacuation means and sealing means respectively.

2. The improvement as in claim 1 wherein the feed means includes an injection nozzle connected to the feed opening.

3. The improvement as in claim 1, wherein the feed means comprises a bin, the means for alternatingly connecting comprising a multiple passage way valve.

4. In a mold having a first mold part and a second mold part, with a cavity and an interface between said mold parts, the improvement comprising:

a feed opening in said first mold part;

charge feed means for supplying and feeding material to be fed into the mold cavity through the feed opening;

evacuation means for providing a low pressure; and means for alternatingly connecting, in a mutually exclusive relation, the feed means and the evacuation means to the feed opening so that upon connection of the evacuation means to the feed opening, a pressure gradient is obtained in the feed opening for obtaining an outflow of air from the mold cavity through the feed opening, while on connecting the feed means to the feed opening, connection to the evacuation means is positively interrupted so that the pressure gradient in the feed opening reverses for obtaining flow of material into the mold cavity.

5. The improvement as in claim 4, wherein the feed means includes an injection nozzle connected to the feed opening.

6. The improvement as in claim 4, wherein the feed means comprises a bin, the means for alternatingly connecting being a multiple passage way valve.

7. The improvement as in claim 4, and including additional means for maintaining reversal of the gradient to prevent any pressure built up in any portion of the cavity during filling that is not yet filled.

8. The improvement as in claim 7, including a sealed connection of the mold cavity to the evacuation means at a point remote from the feed opening.

9. In a mold having a cavity to receive liquidous, curable material fed through a charge and feed opening leading into the cavity, the improvement comprising:

evacuation means for providing a low pressure;

nozzle means movably disposed above said charge and feed opening and selectively connectible to the charge and feed opening;

means for alternatingly selectively connecting the evacuating means to the nozzle means, for temporarily providing a pressure gradient in the charge and feed opening, the pressure gradient being effective in the cavity as pressure reduction therein prior to feeding for evacuating the cavity through the charge and feed opening; and sealing means circumscribing the mold cavity as well as a connection of said cavity to the evacuation means to permit said pressure gradient to be established.

10. The improvement as in claim 9, wherein the nozzle means comprises a nozzle member in an adapter case, the nozzle member being moveably disposed in the case, the case having said sealing means for sealing said case against said mold, said case being separately connected to the evacuation means.

11. The improvement as in claim 9, including separate means for connecting the cavity to the evacuation means to maintain a reversed pressure gradient in the feed opening during feeding of said material for removal of gases from the cavity.

12. In a mold having a cavity to receive a liquidous, curable material fed through a feed opening leading into the cavity, the improvement comprising:

a feed bin above said feed opening, the feed bin being under atmospheric pressure;

a valve being connected between the bin and the feed opening, to control a pressure gradient through the feed opening into the mold cavity during feeding of said material through said feed opening; and evacuation means connected to the valve to obtain a reverse pressure gradient to be effective in the feed opening prior to feeding of said material for evacuating the mold cavity through the feed opening.

13. The improvement as in claim 12, including, in addition, connection and duct means, connected between the mold cavity and the evacuation means to continue the pressure gradient and aid in any suction of air and gases out of the mold cavity during feeding of said material through the feed opening.

14. The improvement as in claim 13, including sealing means circumscribing the cavity and the connection and duct means so that the cavity is sealed to permit the establishing of the reverse pressure gradient.

* * * * *